UNITED STATES PATENT OFFICE.

OSCAR FREDRIK SVANTE CARLSON, OF LJUNGAVERK, SWEDEN, ASSIGNOR TO AKTIEBOLAGET NITROGENIUM, OF STOCKHOLM, SWEDEN.

METHOD OF MANUFACTURING NITROGEN COMPOUNDS FROM CARBIDS.

1,337,750.  Specification of Letters Patent.  Patented Apr. 20, 1920.

No Drawing.  Application filed July 29, 1916.  Serial No. 112,067.

*To all whom it may concern:*

Be it known that I, OSCAR FREDRIK SVANTE CARLSON, a subject of the King of Sweden, and resident of Ljungaverk, in the Kingdom of Sweden, have invented certain new and useful Improvements in Methods of Manufacturing Nitrogen Compounds from Carbids, of which the following is a specification.

It is well known that nitrogen compounds are manufactured from carbids by causing nitrogen to act upon the carbid at an increased temperature. The most important one of such nitrogen compounds is the so called lime-nitrogen (calcium cyanamid) which is produced by causing nitrogen to act at an increased temperature upon calcium carbid or a mixture of the substances from which it is produced, viz. caustic lime and carbon.

The manufacturing of calcium cyanamid is still unsatisfactory in spite of essential improvements which have been made. For instance, the result of manufacturing on a technical scale is essentially inferior to what it should be according to the theory. The main reason for this may be due to the fact that the temperature increases so rapidly, at least at certain points in the exothermic reaction, that the calcium cyanamid formed by the reaction, will dissociate or melt, whereby the nitrogen is prevented from penetrating completely into the mass of carbid.

In order to increase the yield and to accelerate the reaction, it has been proposed to supply the nitrogen at a relatively high pressure, at which pressure the result will be still more improved, if indifferent substances are added to the mixture of the substances in question, which indifferent substances are also heated during the reaction and thus act in an endothermic manner on account of which the temperature can be kept within such limits as to prevent said inconveniences.

However a method of working at which the gas is applied at a high pressure will cause many considerable inconveniences in practice. The furnaces should have a very strong construction in order to stand the high pressure owing to which fact they will be very expensive. Further, it is impossible to avoid great losses of nitrogen in furnaces of the size necessary for industrial working, which will make the process uneconomical. Finally, in using a high pressure of the gas, the danger of an explosion must always be taken into consideration.

The present invention relates to a process of manufacturing nitrogen compounds from carbids in vertical shelf-furnaces or in furnaces of some other construction, which process consists in keeping the mass stirred by means of special rake-like stirring implements in order to facilitate the penetrating of the gas into the said mass. In this method the said disposition of the mass to melt on account of too high an increase of temperature has caused very great difficulties as the mass has stuck to the stirring implements, owing to which fact irregularities of working have arisen.

The present invention thus relates to a process by the use of which said difficulties will be removed to the greatest extent. The invention is based on the observation that if the mass of carbid is stirred during the progress of the reaction or during a considerable part of it either continuously or intermittently and if the stirring is forced to a certain intensity, the reaction between the nitrogen and the mass of carbid can be accelerated to such a degree that the yield will be particularly large with a very inconsiderable loss of nitrogen and without irregularities of working if the carbid is mixed with indifferent substances in such a degree that the temperature of the carbid furnace is prevented from rising to the temperature at which the cyanamid will dissociate or the mass will melt. For the same purpose an addition of catalytic substances may be used, for instance fluorid of calcium either alone or mixed with the indifferent substances.

The quantities of indifferent and catalytic substances may be varied within rather wide limits. When the percentage of added ingredients is increased, the mixing may be less intensive, and when it is reduced, the mixing may be more intensive, the intensity of the mixing being intimately connected with the percentage of catalytic and indifferent substances and the temperature in the different parts of the furnace. If the mixing is not intensive enough with respect to the quantity of additions, the mass will sinter to a block, and the temperature will at the same time rise too much, whereby the mass sticks fast to the stirring implements, the lime-nitrogen formed is dissociated, and economical conditions of manufacture are disturbed. This proportion is easily and simply settled in an experimental way for each type of furnace.

As an example it may be stated that if said substances are added in such a quantity as to make the charge contain 35% of the same, and the reaction is performed at atmospheric pressure or, as often used in practice, at a pressure a little above atmospheric, for instance, a few mm. of the column of mercury, it will be possible to obtain a crude calcium cyanamid having a proportion of nitrogen up to 20%. However, quite good results may also be obtained by a lower proportion of indifferent substances, for instance 10%.

In this process the loss of nitrogen is particularly small, and in industrial working the loss of nitrogen is only about 20%.

The improved yield of calcium cyanamid from the process above described is according to the inventor due to the fact that the added indifferent substances being also heated, absorb a great part of the heat of reaction disengaged and thereby prevent too great an increase of temperature. If simultaneously a catalytic substance is present this will cause a setting-in and continuing of the reaction to a complete reaction at a lower temperature than usual. A melting of the mass is thus avoided, which fact on one hand makes the complete and uniform penetrating of the gas into it possible and on the other hand prevents the mass from sticking to the stirring implements, on account of which irregularities of working are avoided.

The above high utilization of the nitrogen may be due to the fact that the stirring in the presence of indifferent and catalytic substances causes a very uniform distribution of heat and thus uniform absorption throughout all the mass.

Further the fact should be noted as a new and surprising result of this new process that instead of obtaining a cyanamid of compact stony quality there is obtained a porous coke-like product without any disseminated clods of carbid which have not been subjected to the reaction. The cyanamid of this quality can be more easily crushed than the product obtained by the methods heretofore known.

By using a high pressure above atmospheric simultaneously with stirring and the above additions, a result still more favorable as to the yield may be obtained.

What I claim is:

The herein described method of manufacturing nitrogen compounds in a vertical shelf furnace from carbid and nitrogen, consisting in heating the carbid intimately mixed with indifferent and catalytic substances in the furnace in presence of nitrogen and stirring the carbid mixture on its way through the furnace on each shelf to regulate the temperature and fluidity of the mass, the intensity of such stirring being determined by the amount of indifferent and catalytic substances added.

In witness whereof I have hereunto signed my name.

OSCAR FREDRIK SVANTE CARLSON.